United States Patent [19]

Abdulally

[11] Patent Number: 4,761,131
[45] Date of Patent: Aug. 2, 1988

[54] FLUIDIZED BED FLYASH REINJECTION SYSTEM

[75] Inventor: Igbal F. Abdulally, Randolph, N.J.

[73] Assignee: Foster Wheeler Corporation, Clinton, N.J.

[21] Appl. No.: 42,917

[22] Filed: Apr. 27, 1987

[51] Int. Cl.[4] .............................................. F23D 3/40
[52] U.S. Cl. ...................................... 431/7; 431/170; 122/4 D; 110/245; 110/263; 110/344; 110/347; 165/104.16
[58] Field of Search ............... 122/4 D; 110/347, 245, 110/244, 263, 344, 345; 165/104.16; 431/7, 170; 34/57 R, 57 A, 10; 432/14, 15, 58; 422/141–143, 146, 311, 145

[56] References Cited

U.S. PATENT DOCUMENTS

| | | | |
|---|---|---|---|
| 3,902,462 | 9/1975 | Bryers | 122/4 D |
| 4,594,967 | 6/1986 | Wolowodiak | 122/4 D |
| 4,597,774 | 6/1986 | Garcia-Mallol et al. | 431/7 |
| 4,682,567 | 7/1987 | Garcia-Mallol et al. | 122/4 D |

Primary Examiner—James C. Yeung
Attorney, Agent, or Firm—Marvin A. Naigur; Warren B. Kice

[57] ABSTRACT

A fluidized bed reactor and a method of operating same in which a bed of particulate material is supported on a grate in an enclosure. Air is passed through the grate to fluidize the particulate material and promote the combustion of the fuel. At least one separating unit is disposed adjacent each of two walls forming the enclosure for receiving the mixture of air, the gaseous products of combustion and the relative fine particulate material entrained by the air and gaseous products of combustion. Each separating unit operates to separate the particulate material from the mixture, and a distributor unit is associated with each separating unit for receiving the separated particulate material and distributing it to the bed at multiple locations.

4 Claims, 1 Drawing Sheet

FLUIDIZED BED FLYASH REINJECTION SYSTEM

BACKGROUND OF THE INVENTION

This invention relates to a fluidized bed reactor and a method for operating same, and, more particularly, to such a reactor and method in which the entrained particulate material from the bed is separated from the entraining mixture of gaseous products of combustion products and air and reinjected back into the bed at multiple points.

Fluidized bed reactors, in the form of combustors, boilers, steam generators and the like, have long been recognized as an attractive and effective means of generating heat. In these arrangements, air is passed through a bed of particulate material which normally consists of a mixture of reactive and/or inert material and a particle fossil fuel, such as coal, to fluidize the bed and to promote the combustion of the fuel. The fluidized bed offers an attractive combination of high heat release, improved heat transfer to surface within the bed, and compact size.

During the operation of a fluidized bed, the fluidizing air mixes with the gaseous products of combustion and the resulting mixture entrains, or elutriates, a significant portion of the relatively fine particulate material in a bed, which is carried out of the furnace and not utilized. Some known arrangements of fluidized beds incorporate a cyclone separator, or the like, to separate the entrained solid particulate material from the mixture of air and gaseous products of combustion, and the separated material is then reinjected back into the bed. However, the reinjection point is usually at one location either above the surface of the bed or below the surface of the bed which results in less than uniform distribution of the particulate material in the bed, and thus compromises the total fuel burn-up efficiency. Also, these reinjection systems normally employ a means of pneumatic transport which are fairly complex and require a relatively high volume of air to achieve the reinjection process. Further, these type systems suffer from a relatively high power consumption and a relatively high degree of material clogging in the separator hoppers.

SUMMARY OF THE INVENTION

It is therefore an object of the present invention to provide a fluidized bed reactor and a method of operating same in which the entrained, relatively fine, particulate material is separated from the entraining mixture of air and gaseous products of combustion and reinjected back into the bed.

It is a further object of the present invention to provide a reactor and method of the above type in which the reinjection of the separated particulate material is done at multiple points in the bed.

It is a further object of the present invention to provide a reactor and method of the above type in which a uniform distribution of the particulate material in the bed is achieved along with a resulting higher total fuel burn-up efficiency.

It is a still further object of the present invention to provide a reactor and method of the above type in which the reinjection is achieved utilizing fewer moving parts and lower air and power consumption.

It is a still further object of the present invention to provide a reactor and method of the above type which minimizes material clogging in the separating units.

Toward the fulfillment of these and other objects, a bed of particulate material including fuel is supported on a grate disposed in an enclosure. Air is passed through the grate to fluidize the material and promote the combustion of the fuel. At least one separating unit is disposed adjacent to one or more walls of the enclosure for receiving the mixture of air, gaseous products of combustion and the entrained particulate material, and separating the particulate material from the mixture. The separated particulate material is then distributed back into the bed at multiple locations.

DESCRIPTION OF THE PREFERRED EMBODIMENT

Figure 1:
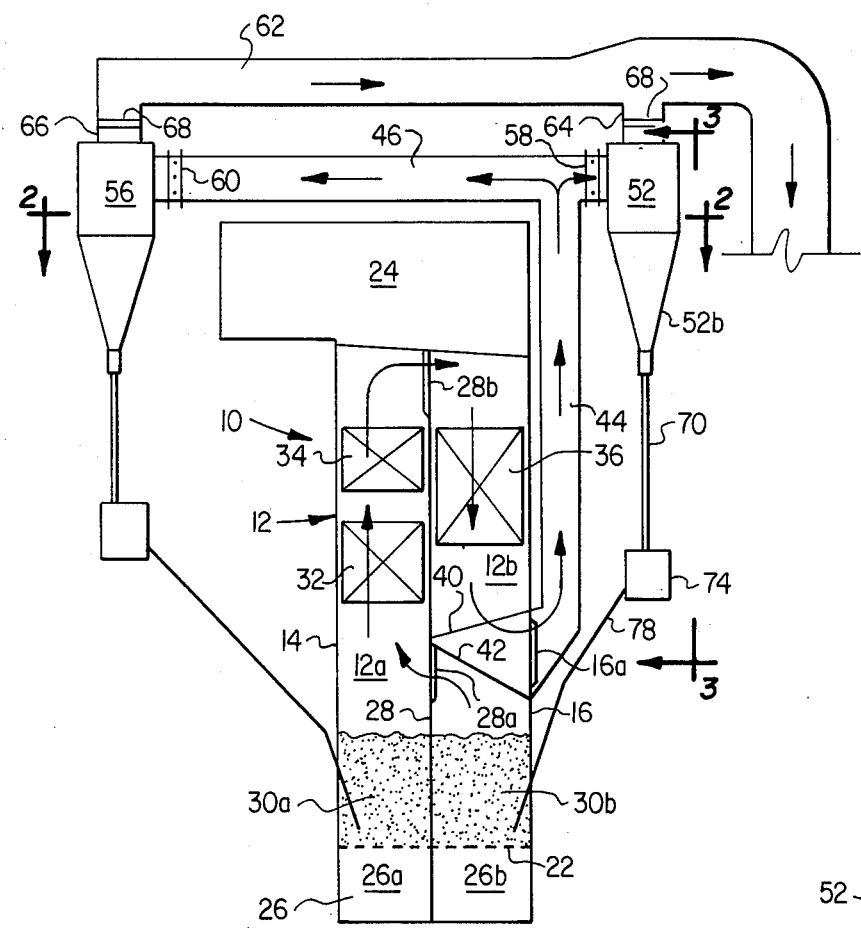
FIG. 1 is a schematic view of a fluidized bed reactor employing features of the present invention.
Figure 2:
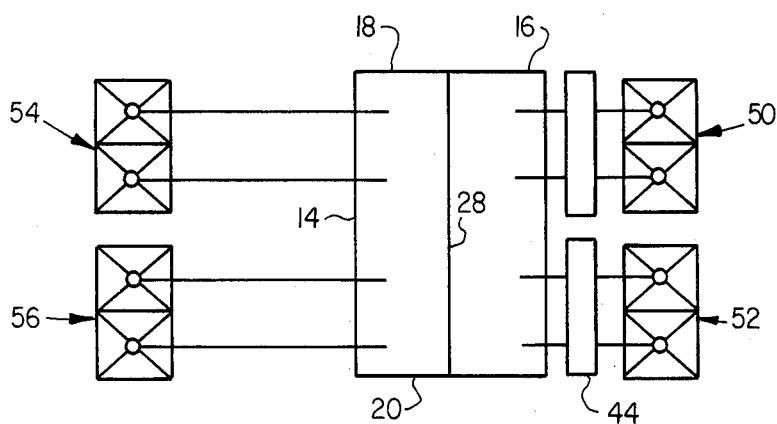
FIG. 2 is a cross-sectional view taken along the line 2—2 of FIG. 1.

Referring to FIGS. 1 and 2 of the drawings, the reactor of the present invention is shown, in general, by the reference numeral 10 and includes a vertically extending rectangular upright furnace enclosure 12 defined by a front wall 14, a rear wall 16, and two side walls 18 and 20 (FIG. 2). The walls 14, 16, 18 and 20 are formed by a plurality of panels of finned tubes extending vertically from a perforated grate 22 to a penthouse, or roof 24. An air plenum 26 is disposed immediately below the grate 22 and receives air from an external source (not shown), which air passes upwardly through the grate for reasons to be described in detail. A partition 28 divides the enclosure 12 into two chambers 12a and 12b and extends into the air plenum 26 to divide it into two portions 26a and 26b.

Two beds of particulate material 30a and 30b are disposed in the chambers 12a and 12b, respectively, and extend from the grate 22 to a point intermediate the height of the furnace 12, with the beds being separated by the partition 28. It is understood that the particulate material contains a fuel material such as coal, and an absorbent for absorbing the sulphur generated during combustion of the coal, which absorbent could be in the form of limestone or the like. It is also understood that a feeder, or the like, (not shown), is associated with the enclosure 12 to distribute fresh particulate material into the chambers 12a and 12b to replace the particulate material burned and used during operation, and that a burner, or the like, can be provided for igniting the combustible material, all in a conventional manner.

An opening 28a is provided in the partition 28 at a point just above the upper surface of the beds 30a and 30b to permit the air and gaseous products of combustion in the chamber 12b to pass to the chamber 12a for reasons that will be described. In a similar manner, an opening 28 is provided in the upper portion of the partition 28 to permit the air and gaseous products of combustion to pass from the chamber 12b to the chamber 12a, also for reasons to be described in detail later.

A pair of banks 32 and 34 of heat exchange tubes are disposed in the chamber 12a and a bank 36 of heat exchange tubes are disposed in the chamber 12b. A screen 40 is disposed in the chamber 12b below the tube bank 36, and a solid partition 42 is disposed in the chamber 12b below the screen 40. The screen 40 and the partition 42 extend at a angle to the horizontal and their corresponding end portions define an opening 16a in the wall 16. A vertical duct 44 is disposed adjacent the wall 16 in communication with the opening 16a, and connects to a horizontal duct 46 extending above the penthouse 24 in a slightly spaced relation thereto.

As shown in FIG. 2, two cyclone separators 50 and 52 extend adjacent the rear wall 16, while two separators 54 and 56 extend adjacent the front wall 14. The separators 52 and 56 are connected to the respective ends of the duct 46 and a pair of multi-louver control dampers 58 and 60 are disposed in the end portions of the duct 46, respectively, to control the flow through the duct and into the separators 52 and 56 as will be described further.

An outlet duct 62 extends above the separators 52 and 56 and is connected thereto by vertical duct sections 64 and 66 associated with the separators 52 and 56, respectively. A shutoff damper 68 is disposed in each of the vertical duct sections 64 and 66. It is understood that vertical ducts and horizontal ducts identical to the ducts 44, 46 and 62 and the components associated therewith are provided for the separators 50 and 54 in a manner identical to that discussed in connection with the separators 52 and 56.

Figure 3:
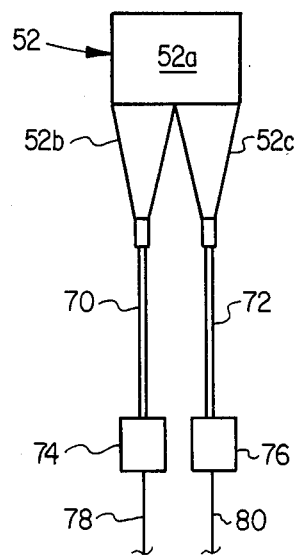
FIG. 3 is a cross-sectional view taken along the line 3—3 of FIG. 1.

As shown in FIG. 3, the separator 52 includes a separating section 52a and two hopper sections 52b and 52c extending integral with, and downwardly from, the separating section 52a. A pair of diplegs 70 and 72 extend from the hopper portions 52b and 52c and are connected to a pair of seal pots 74 and 76, respectively. A pair of injection needles 78 and 80 extend from the seal pots 74 and 76, and through the wall 16 and into the bed 30b in the chamber 12b at spaced locations as shown in FIG. 2. Since the separators 50, 54 and 56 are constructed identically to the separator 52 and have identical diplegs, seal pots and injection needles associated therewith, they will not be described in any further detail.

The operation of the reactor 10 will be described in connection with its use as a steam generator in which water is passed through the finned tubes forming the walls 14, 16, 18 and 20, and through the tube banks 32, 34 and 36. The heat generated in the furnace enclosure 12 is thus added to the water as it passes through the system, it being understood that suitable piping (not shown) can be provided to provide for the circulation of the water in a conventional manner. Pressurized air is introduced into the plenum 26 whereby it passes upwardly through the plenum sections 26a and 26b, through the grate 22 and into the chambers 12a and 12b, whereby it fluidizes the particulate material forming the beds 30a and 30b.

The gaseous products of combustion from each fluidized bed 30a and 30b combine with the air passing through the beds and the mixture entrains the relatively fine particulate material from the beds. The mixture of air, gas and entrained material from the bed 30b passes through the opening 28b and into the chamber 12a whereby it combines with the mixture of air, gas and entrained material from the bed 30a. The resulting mixture passes upwardly in the chamber 12a, over the tube banks 32 and 34, through the opening 28b in the partition 28, and then downwardly across the tube bank 36. From the tube bank 36, the mixture continues to pass downwardly in the chamber 12b and over the screen 40 before exiting, via the opening 16a, and into the vertical duct 44. The portion of the mixture in the duct 44 then passes upwardly into the horizontal duct 46 whereby it passes through the control dampers 58 and 60, and into the separators 52 and 56, respectively. The separators 52 and 56 operate to separate the fine particulate material from the mixture of air and gas, with the latter mixture passing upwardly through the vertical outlet ducts 64 and 66 and into the horizontal outlet duct 62, whereby it is discharged to an economizer or the like (not shown). The remaining portion of the mixture passes through the vertical and horizontal ducts and associated components (not shown) associated with the separators 50 and 54 and is separated and then treated in the manner described in connection with the separators 52 and 56.

The fine particulate material separated in the separator 52, passes downwardly through the hopper sections 52b and 52c, the diplegs 70 and 72, the fluidized seal pots 74 and 76, and the injection needles 78 and 80, before being injected into the fluidized bed 30b in the chamber 12b. Air or gas may be provided to assist the flow of material through the injection needles. The operation of the separators 50, 54, and 56 are identical to that of the separator 52 and, as a result, the particulate material from the separators 50 and 52 are injected at four spaced points (FIG. 2) in the fluidized bed 30b, while the separated particulate material from the separators 54 and 56 are injected at four spaced points into the bed 30a.

Several advantages result from the foregoing. For example, a uniform distribution of particle material in the fluidized beds is achieved along with a resulting higher total fuel burn-up efficiency. Also this multiple reinjection is achieved utilizing fewer moving parts and lower air and power consumption, while almost eliminating material clogging.

It is understood that several variations may be made in the foregoing without departing from the scope of the invention. For example, the injection points in the respective fluidized bed portions can be made above the upper surface of the beds rather than into the beds as shown in the drawings. Also, it is understood that fluidizing air or gas can be provided to each seal pot by a distribution grid (not shown) so that, at any time during operation, the free space pressure in the seal pot is equal to the back pressure exerted by the fluidized bed plus the resistance in the transfer line. Also the pressure drop across each of the separators can be measured and then equalized by a control system with the help of the dampers 58 and 60 in the horizontal duct 46 to ensure equal gas flow to each of the separators. Further the reinjection needles associated with the separators can be protected from the high temperature of the bed by a refractory-covered air-cooled jacket arrangement, with the cooling air being obtained from the air plenum 26 or another suitable source.

Other modifications, changes and substitutions are intended in the foregoing disclosure and, in some instances, some features of the invention can be employed without a corresponding use of other features. Accordingly, it is appropriate that the appended claims be construed broadly and in a manner consistent with the scope of the invention therein.

What is claimed is:

1. A fluidized bed reactor comprising an enclosure, partition means disposed in said enclosure for dividing said enclosure into a first and second chamber, a grate disposed in said enclosure for supporting a bed of particulate fuel material in each chamber, means for passing air through said grate to fluidize said material in each chamber, a first series of separating units disposed on one side of said enclosure and a second series of separating units disposed on the other side of said enclosure, means connecting said first and second chambers to said first and second series of separators, respectively, so that said separators receive a mixture of said air, the gaseous products of combustion of said fuel, and the relatively fine particulate material entrained thereby and separate said material from said mixture, first and second distributing means respectively associated with said first and second series of separating units for receiving said separated material from said separating units, respectively, and distributing said separated particulate material back to said first and second chambers, respectively at multiple locations in each chamber.

2. The reactor of claim 1 wherein each of said distributing means distributes said separated material to the bed in each chamber at two spaced locations.

3. A method of operating a fluidized bed reactor comprising the steps of supporting two beds of particulate material including fuel, passing air to said material in each bed to fluidize said material and promote the combustion of said fuel, passing a mixture of said air, the gaseous products of combustion and the relatively fine particulate material entrained thereby to a first series of separators located adjacent one of said chambers and a second series of separators located adjacnet the other chamber, said separators, adapted to separate said material from said mixture at said locations, and distributing said separated particulate material from said first and second series of separators back to said one and said other chamber, respectively, at multiple locations.

4. The method of claim 3 wherein said separated material is distribued to each of said chamber at two spaced locations.

* * * * *

UNITED STATES PATENT AND TRADEMARK OFFICE
CERTIFICATE OF CORRECTION

PATENT NO. : 4,761,131
DATED : August 2, 1988
INVENTOR(S) : Iqbal F. Abdulally

It is certified that error appears in the above-identified patent and that said Letters Patent is hereby corrected as shown below:

On the title page, the inventor should read

-- Iqbal F. Abdulally --, and the Assignee should read

-- Foster Wheeler Energy Corporation, Clinton, N.J. --

Signed and Sealed this

Twenty-sixth Day of December, 1989

Attest:

JEFFREY M. SAMUELS

*Attesting Officer*     *Acting Commissioner of Patents and Trademarks*